US008621341B2

(12) United States Patent
Kern et al.

(10) Patent No.: US 8,621,341 B2
(45) Date of Patent: Dec. 31, 2013

(54) THEMING ENGINE

(75) Inventors: Jonathan Fred Kern, Kirkland, WA (US); Richard Eric Andeen, Seattle, WA (US); Mario Roberto Baumann, Kirkland, WA (US); Thomas Richard Allen Ham, Seattle, WA (US); Ashok Kuppusamy, Seattle, WA (US); Cindy Liao, Bellevue, WA (US); Frederico A. Mameri, Seattle, WA (US); Aditi Mandal, Bothell, WA (US); Elisabeth Olson, Bellevue, WA (US); Jane Jiyoon Park, Bellevue, WA (US); Lionel Robinson, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 219 days.

(21) Appl. No.: 13/284,808

(22) Filed: Oct. 28, 2011

(65) Prior Publication Data

US 2013/0111324 A1 May 2, 2013

(51) Int. Cl.
*G06F 17/21* (2006.01)
*G06F 17/22* (2006.01)

(52) U.S. Cl.
USPC .......................................... 715/230; 715/223

(58) Field of Classification Search
USPC ................................................. 715/230, 223
See application file for complete search history.

(56) References Cited

U.S. PATENT DOCUMENTS

| | | | |
|---|---|---|---|
| 7,054,783 B2 | 5/2006 | Morishita | 382/162 |
| 7,161,710 B1 * | 1/2007 | MacLeod | 358/1.9 |
| 7,330,585 B2 | 2/2008 | Rice et al. | 382/162 |
| 7,408,678 B1 * | 8/2008 | MacLeod | 358/1.9 |
| 7,468,813 B1 * | 12/2008 | MacLeod | 358/1.9 |
| 7,684,096 B2 | 3/2010 | Gonsalves | 358/518 |
| 8,384,654 B2 * | 2/2013 | Fujine et al. | 345/102 |
| 8,416,179 B2 * | 4/2013 | Kerofsky | 345/102 |
| 8,442,311 B1 * | 5/2013 | Hobbs et al. | 382/166 |
| 2002/0080168 A1 * | 6/2002 | Hilliard et al. | 345/744 |
| 2003/0097475 A1 | 5/2003 | York | 709/246 |
| 2003/0139840 A1 * | 7/2003 | Magee et al. | 700/133 |
| 2006/0181750 A1 * | 8/2006 | Lu et al. | 358/527 |
| 2006/0244748 A1 * | 11/2006 | Long et al. | 345/422 |
| 2008/0079750 A1 | 4/2008 | Setlur | 345/593 |
| 2008/0177994 A1 * | 7/2008 | Mayer | 713/2 |
| 2009/0228955 A1 * | 9/2009 | Gibson et al. | 726/1 |
| 2010/0110101 A1 | 5/2010 | Relyea et al. | 345/594 |
| 2010/0194776 A1 * | 8/2010 | Chong et al. | 345/594 |
| 2011/0175925 A1 * | 7/2011 | Kane et al. | 345/589 |
| 2013/0027571 A1 * | 1/2013 | Parulski | 348/207.11 |

OTHER PUBLICATIONS

Wang, et al. *Data-Driven Image Color Theme Enhancement*. Published Date: 2010-0-04. http://www.cs.uiuc.edu/homes/yyz/publication/ImageColorTheme-sig_asia2010.pdf. Proceedings: SIGGRAPH Asia '10 ACM SIGGRAPH Asia 2010 papers. 10 pages.

* cited by examiner

*Primary Examiner* — Doug Hutton, Jr.
*Assistant Examiner* — Soumya Dasgupta
(74) *Attorney, Agent, or Firm* — Merchant & Gould

(57) ABSTRACT

A cascading stylesheet (CSS) file transformed with user-selected design variables is provided. One or more CSS files may be received as a first input item, and user defined colors, fonts, layout, and images may be received as a second input item. Embodiments provide for determining if the colors and fonts selected by the user are usable and legible. User-selected color and font schemes may be modified if necessary, and a modified CSS file may be outputted to a rendering engine for rendering an aesthetically pleasing, usable, and legible web page.

19 Claims, 8 Drawing Sheets

THEMING ENGINE

BACKGROUND

With advancements in web design application software, users are able to create web pages with little to no web design knowledge or experience. Many current web design software applications offer templates for helping users without design experience to create professional-looking web pages. Some web design software applications offer tools for allowing users to change the look and feel of their web pages. When a user modifies a template by selecting colors, fonts, layouts, etc., a set of cascading style sheet (CSS) files describing presentation properties of the pages may be modified with the user's selections. This is oftentimes a direct translation.

While it may be desirable for non-design experienced users to be able to customize a web page with the use of user friendly tools, giving users this ability oftentimes leads to web page designs that lack usability, legibility, and aesthetically pleasing fonts and colors.

It is with respect to these and other considerations that the present invention has been made.

SUMMARY

Embodiments of the present invention solve the above and other problems by providing users lacking web design experience with the ability to create professional-looking web pages. As described above, prior methods for customizing a web page template comprise passing a CSS file with modifications made by a user to a rendering application that would ultimately use the content of the CSS file to render a web page.

Embodiments of the present invention provide for receiving a CSS file as a first input item and receiving user defined colors, fonts, layout, and images as a second input item. Embodiments may determine if the colors and fonts selected by the user are usable and legible, and may modify user-selected color and font schemes if necessary. A modified CSS file may be outputted to a rendering engine for rendering an aesthetically pleasing, usable, and legible web page.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
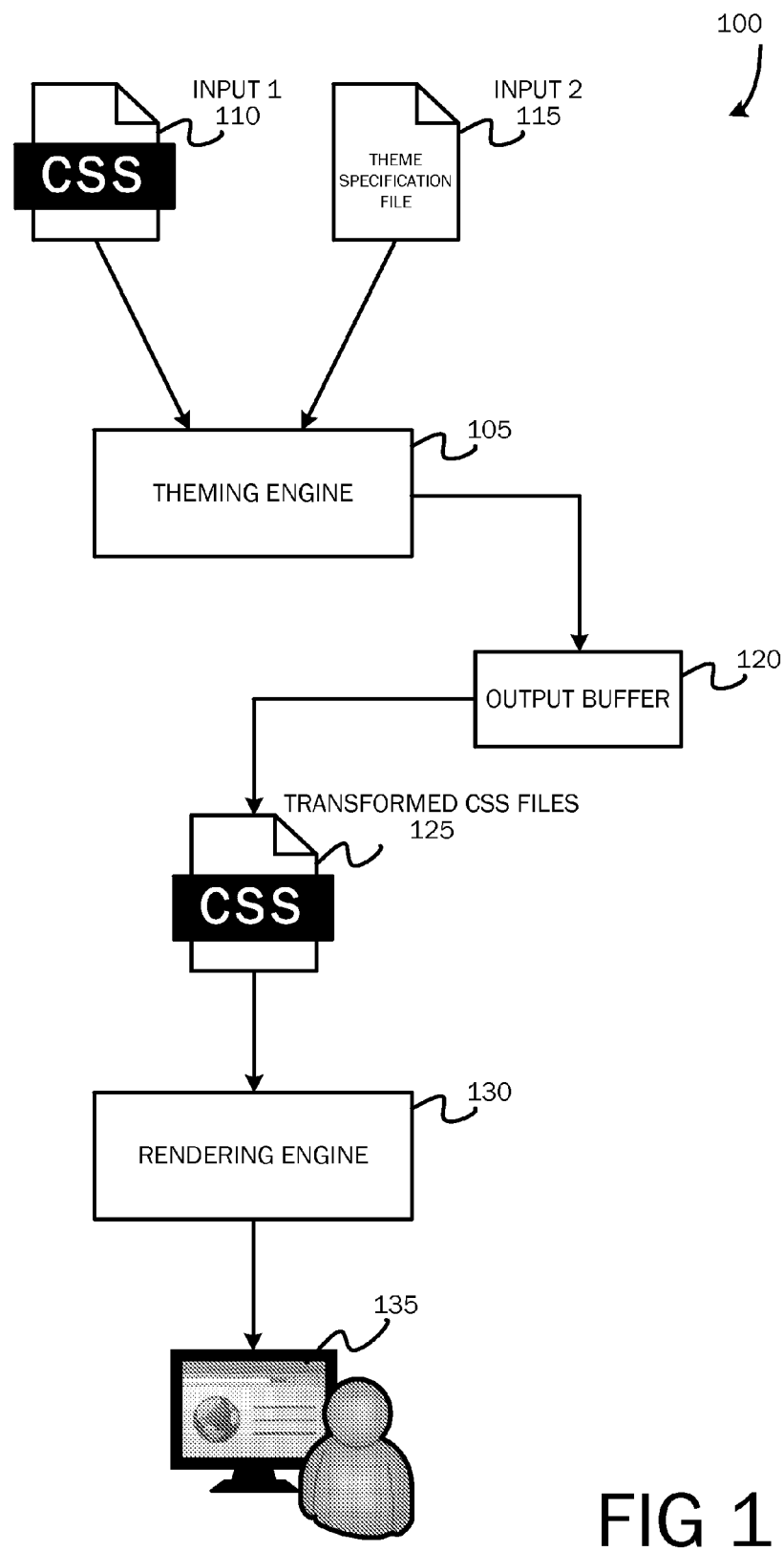
FIG. 1 is a block diagram illustrating an example system architecture.

As briefly described above, embodiments of the present invention are directed to providing presentation properties of a web page in a transformed cascading style sheet file according to user-defined design variables. The user-defined design variables may be verified to meet a prescribed design criteria before the transformed cascading style sheet file is outputted to a rendering engine for rendering a web page.

The following description refers to the accompanying drawings. Whenever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Referring now to the drawings, in which like numerals represent like elements through the several figures, aspects of the present invention and the exemplary operating environment will be described. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, as described above, a theming engine 105 may be utilized to output a transformed cascading style sheet file according to received specification input for color, font, and/or image transformations for rendering a web page. The system architecture illustrated in FIG. 1 is one example of a system architecture, but is not limiting of a vast number of systems that may be employed for embodiments of the present invention. The theming engine 105 may be utilized to receive input items, for example, a set of style sheet files, such as cascading style sheet 110 files, and theme specification input 115, as shown in FIG. 1. Although shown in FIG. 1 as a single file, a plurality of specification may be applied together.

The first input item, which may be a cascading style sheet (CSS) file or a set of cascading style sheet 110 files, may be provided for describing presentation properties of a document, such as a web page 135. CSS files 110 may define such presentation properties as, but not limited to, color, font, text alignment, size, and layout. CSS files 110 may comprise one or more annotations, which may be in the form of comments, which may be a mapping between a CSS and a resulting document (e.g., web page 135). An annotation may precede a CSS syntax specifying a presentation property, for example, a color value. As should be appreciated, an annotation may precede other CSS syntaxes such as, but not limited to, an image declaration or a font declaration. According to embodiments, a multilingual webpage may comprise separate CSS files 110 for each language so that page formatting may be in a presentation more natural to a user of a specific language.

As shown in FIG. 1, theme specification file input 115 may be received by the theming engine 105. The theme specification input file 115 may be one or more theme specification files generated according to design variables chosen by a user via a color scheme, a layout, a font scheme, and inclusion of one or more images. According to one embodiment, multiple theme specifications 115 may be combined before being passed to the theming engine 105. According to another embodiment, a plurality of theme specifications 115 may be passed to the theming engine 105 and may be consolidated by the theming engine 105.

Figure 2:
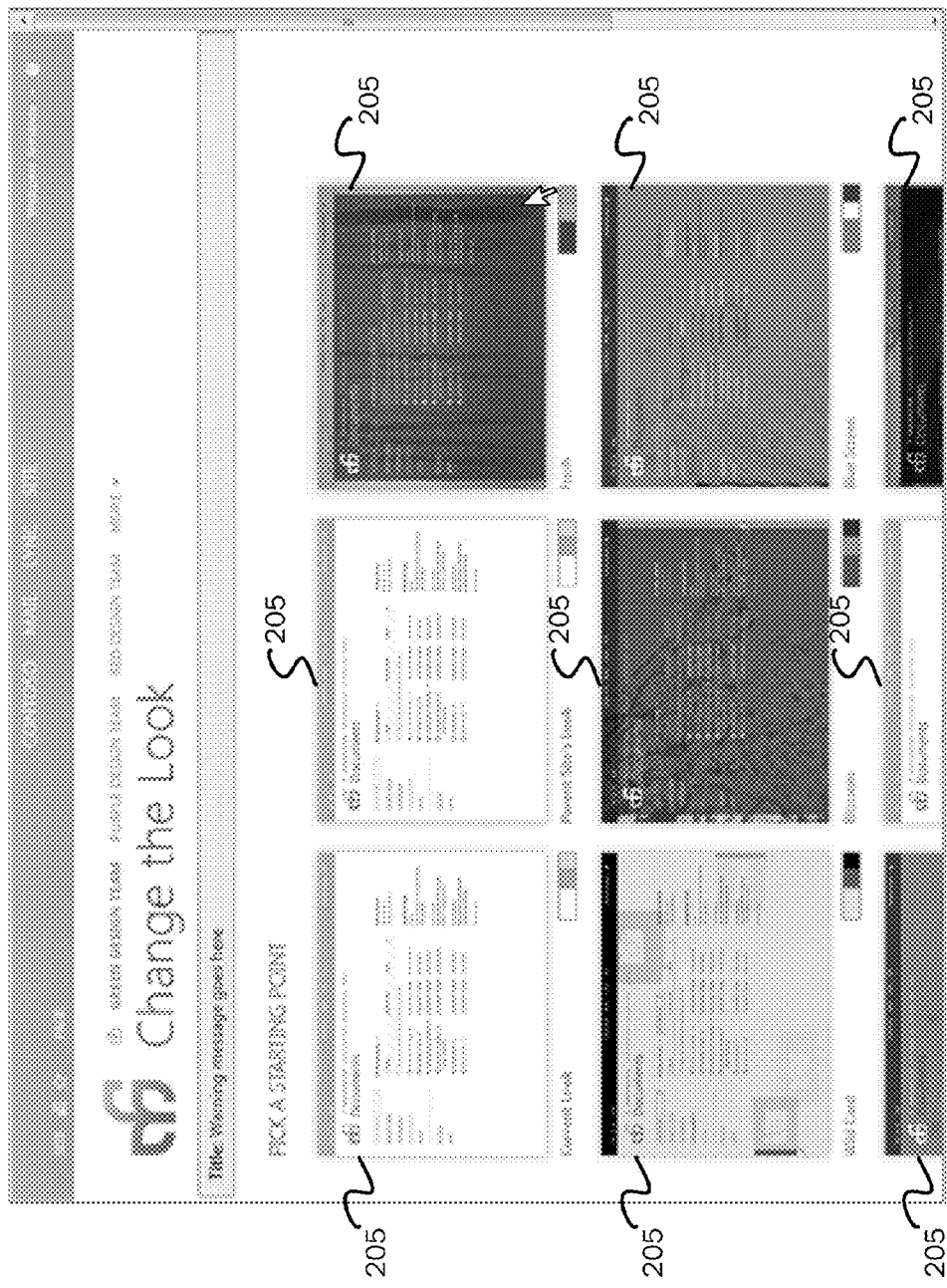
FIG. 2 is an illustration of an example user interface providing a selectable design variable of page layouts.

With reference now to FIG. 2, a user interface 200 with various design combinations 205 is illustrated. The shown user interface 200 is an example of a starting point for a user to choose a starting set of design variables for a page, such as a web page 135. The starting set of design variables may include a plurality of design combinations 205 from which to choose. A design combination 205 may comprise a starting color scheme and a starting font scheme. Upon selecting a design combination 205, a second user interface 300 may be provided for modifying design variables as shown in FIG. 3.

Figure 3:
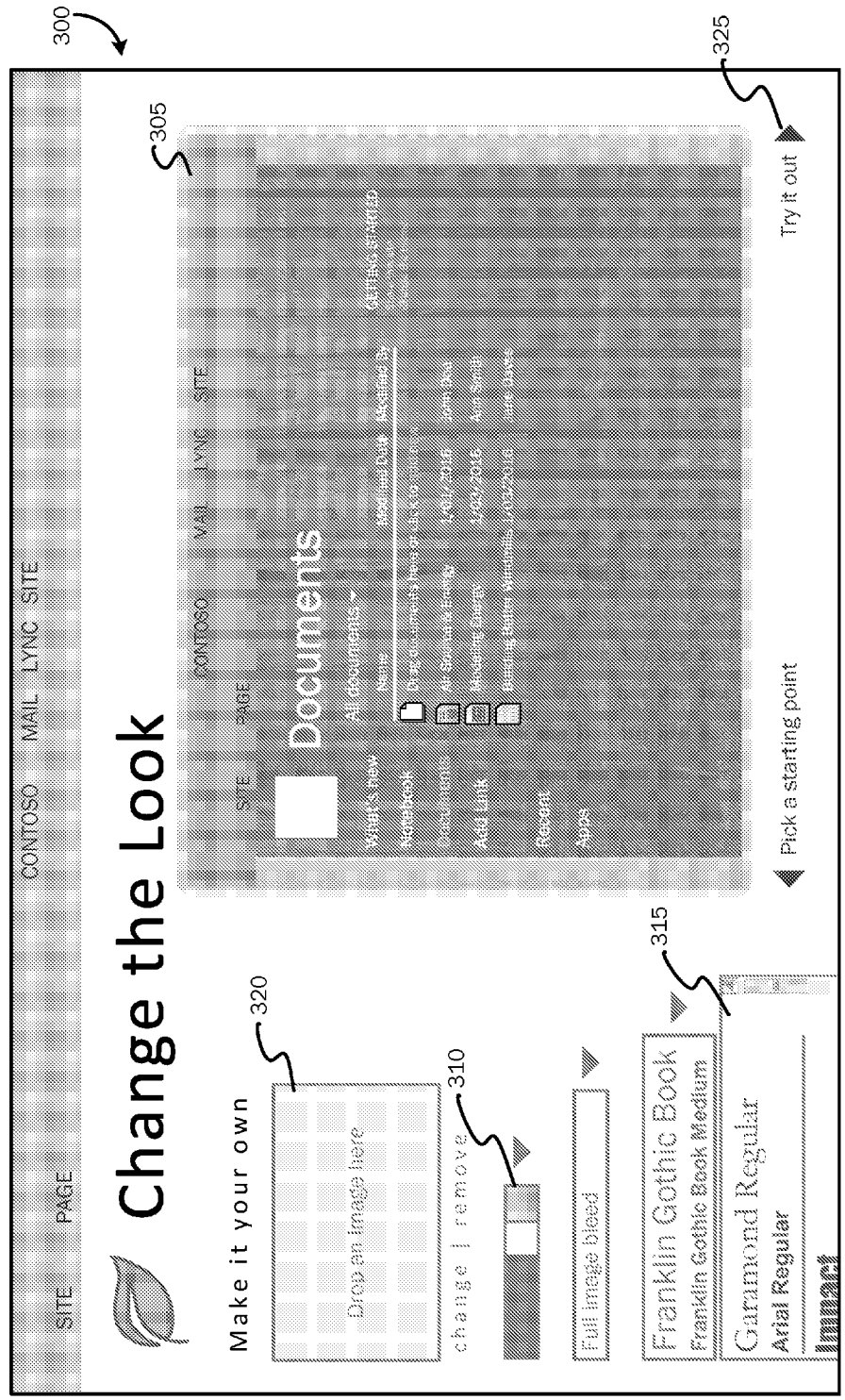
FIG. 3 is an illustration of an example user interface providing a mock preview of a web page and selectable design variables of color schemes, font schemes, and an inclusion of an image.

Referring to FIG. 3, various color palettes may be provided for selecting a color scheme 310 for applying to the web page 135. According to an embodiment, a color palette may be a predetermined set of colors that may be considered as an aesthetically pleasing group of colors for display on a monitor. Various font families may also be provided for selecting a font scheme 315 to apply to the web page 135. According to an embodiment, a font scheme may be a designer produced scheme comprising a plurality of fonts that coordinate typographically. According to one embodiment, a font scheme may comprise a collection of four fonts. As shown in FIG. 3, an image input element may be provided for inserting an image 320 into the web page 135.

According to an embodiment, the inserted image 320 may be used as a background image. A path to the inserted image 320 in a theme specification file 115 may be outputted to the new CSS file 125 based on where the annotation is placed in the input CSS file 110. The image may be processed with an overlay of a translucent block of color so that text on top of the image 320 may be legible. The translucent block of color may be provided via specifying color via an RGBA syntax, wherein the "A" specifies an alpha channel.

Referring still to FIG. 3, a mock preview 305 may be provided. According to embodiments, a mock preview 305 may be an HTML representation of a selected layout with tokenized aspects which may include a selected color scheme 310, a selected font scheme 315, and/or an inserted image 320. The mock preview 305 may be updated in real time via string replacement on the client. After a user has finished making design variable selections, a control 325 may be selected, illustrated in FIG. 3 as an arrow and the text "Try it out", which when selected, may output the chosen design variables to the theming engine 105. According to embodiments, the chosen design variables 310,315,320 may be passed to the theming engine 105 in a single theme specification file 115. According to other embodiments, chosen design variables may be passed to the theming engine 105 in a plurality of theme specification files 115.

As described briefly above and with reference back to FIG. 1, the theming engine 105 may be operable to receive a set of CSS files 110 and one or more theme specification files 115 as inputs. According to embodiments, the theming engine 105 may scan through CSS files 110 for declarations for color, font, or image properties. When a CSS color, font, or image property declaration is found, for example, a CSS rule with a color declaration for a hexadecimal color value such as {font color:#B40404}, the theming engine 105 may check for a theming annotation occurring since the end of a previous property declaration (e.g., a last instance of a semicolon or closing bracket). For example, a theming annotation may be "accent 1." The font color (e.g., #B40404) and the annotation (e.g., accent 1) may be sent into a code path for replacing the existing color #B40404 with the color defined in the theme specification file 115 for the slot "accent 1". According to embodiments, the theming engine 105 may read color values of various syntaxes. The theming engine 105 may note the context in which the color existed. Accordingly, when the code path of the color replacement is run, the appropriate syntax may be output where the original color existed.

According to embodiments, various rules may be applied for defining legible and aesthetically pleasing fonts, colors, and layouts. User defined colors and fonts may be modified to preserve legibility factors of default specified colors and fonts. According to one embodiment, when a user chooses colors to use for a web page 135, the lightness of the chosen colors may be matched against the lightness of the default colors while the hue may be preserved. If the lightness for a user-chosen background and foreground are inverted (e.g., light-on-dark color scheme), the proportional inverse of the lightness value of the default colors may be utilized. According to another embodiment, alternative color choices may be suggested if the user-chosen colors do not meet legibility rules.

According to embodiments, when the theming engine 105 scans an input CSS file 110 and finds a font declaration and if the font declaration is annotated to be replaced, the engine may go into the font scheme 315, find the font being requested, and output the appropriate font into the outputted CSS file 125. In some cases, a requested font may be considered a non-web safe font. A non-web safe font may be a font that is not a standard font. That is, a non-web safe font may be less likely to be installed a user's computing device. Therefore, if a non-web safe font is selected for a web page 135, the end user may not see the web page in the font that the user designing the page intended. Embodiments of the present invention provide for ensuring that a web page 135 with the intended font is displayed to an end user by embedding the font into the web page. According to embodiments, when the theming engine 105 scans a CSS file 110 and sees a font declaration, the theming engine looks for an associated annotation. If an associated annotation is found, the font scheme file may be searched for an appropriate font to insert. If the font has a URL for the font, the font is a web font file. It may be determined that the font is not a web-safe font. The necessary syntax to embed the font may be outputted into the output CSS file 125. When the associated web page 135 is requested, the web font file may be served along with the web page 135. Accordingly, the font may be displayed on the web page 135 as the user designing the page intended.

As shown in FIG. 1, the system 100 may include an output buffer 120. According to embodiments, an input CSS file 110 may contain text and nonfunctional portions of annotations that may be streamed through the theming engine 105 that are not items of interest. That is, the text may not contain color, font, or image property declarations or declarations with preceding annotations. These text items may be directly copied from the input 110 into the output buffer 120. When an item of interest is found in a CSS file 110 (i.e., a declaration for color, font, or an image property with a preceding annotation), the specified item may be put into a code path, where the replacement may be made if necessary, and the modified item may be outputted into the output buffer 120.

According to embodiments, some found items of interest may be outputted to the output buffer 120 as an item to be done in a subsequent step. For example, if a reference to an image with an annotation for the image to be recolored is found, the item may be outputted to the output buffer 120 for the image processing to be done subsequently. When the output buffer 120 is transformed into a new CSS file 125, items such as text input may be printed out into a text output. When a to-do item, for example, the image processing item, is found, the image may be read off a file path to do the appropriate image processing, for example, to change the color. The outputted file may be produced and saved into a useful location, and a path to the outputted file may be outputted into the new CSS file 125. According to embodiments, metadata for themes may also be output. The metadata may include, but is not restricted to, information about a theme (e.g., color theme, usage statistics, hit/miss rates, errors found, performance metrics, and accessibility information including localized color names, etc.).

When the new CSS files 125 have been output into a path, the new CSS files may be passed through a rendering engine 130. A preview of the updated web page 135 may be displayed to the user via the user's browser. The preview may be a true preview of his/her web page 135 with the theming parameters applied, and may be accessible only to the user. At this point, the CSS output files 125 have been produced; however, the web site has not been set to point to the new output files yet. Upon receiving a selection from the user to keep the new web page 135 design, the site may be set to point to the newly generated CSS files 125. Accordingly, for users who access the site, the new CSS files 125 will be loaded from a folder containing the new themed CSS files instead of from the default path, and the new web page 135 design will be displayed. As mentioned previously, separate CSS files 125 may be provided for each language of multilingual web pages 135. Each CSS file 125 may provide for a more natural presentation to a user of a specified language.

Figure 4:
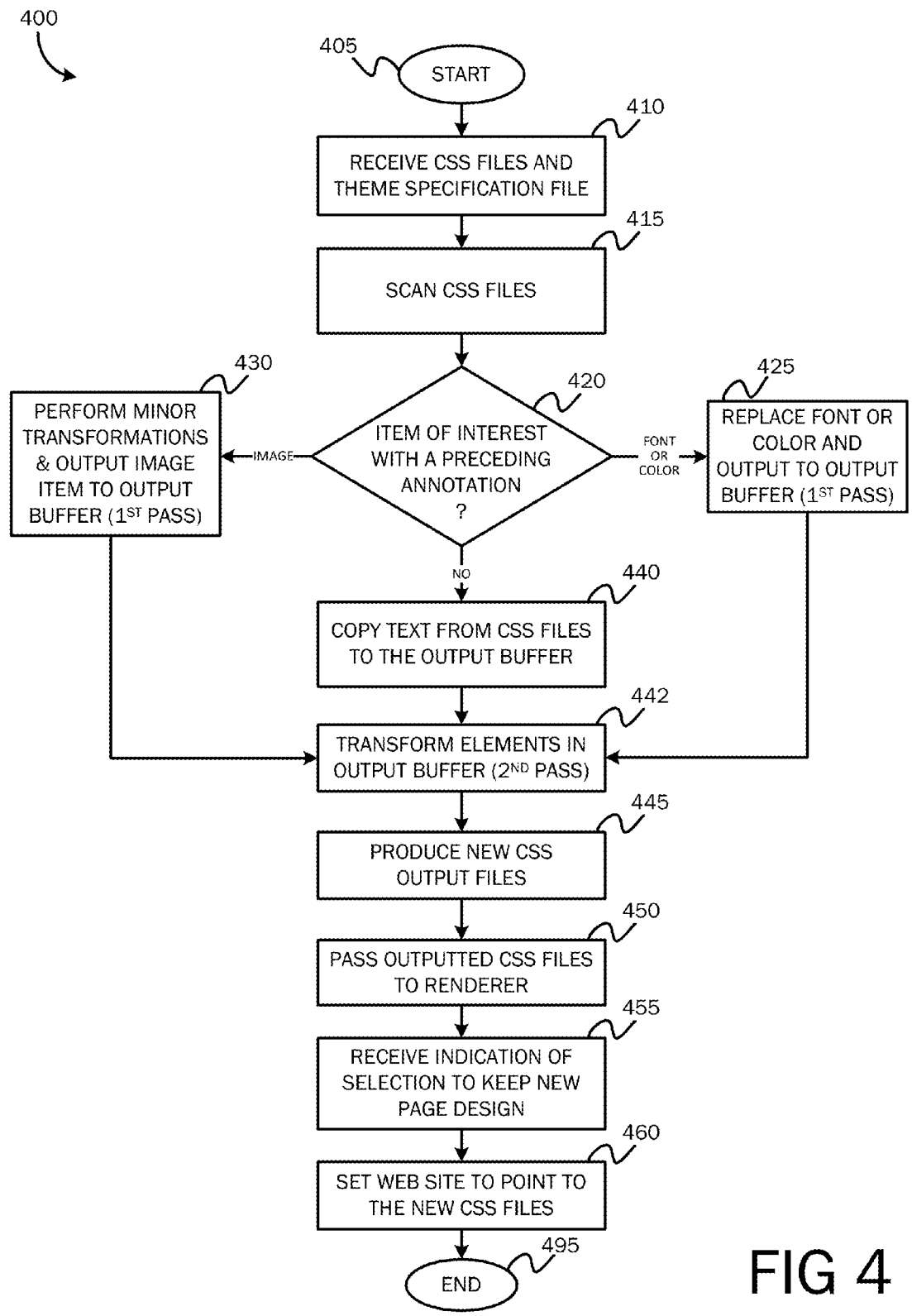
FIG. 4 is a process flow diagram illustrating an example process of generating a modified CSS file according to design variables selected by a user.

Having described an example system architecture 100, FIG. 4 is a flow diagram illustrating a process 400 of generating CSS files that point at a themes path instead of a default path according to an embodiment. The process starts at OPERATION (405), and proceeds to OPERATION (410) where CSS files 110 and one or more theme specification files 115 are received by a theming engine 105. As was described above, the CSS files 110 may store external style sheets defining how to display HTML elements in a web page 135. A theme specification file 115 may comprise design variables (e.g., color scheme 310, font scheme 315, and/or an image 320) selected by a user for customizing the web page 135.

Upon receiving an indication to generate a preview of the new web page 135 design, the theming engine 105 may scan the input files 110, 115 for items of interest (415). According to embodiments, and as was described above, an item of interest may include a declaration with a font, color, or image value. If an item of interest is found, the theming engine 105 may look to see if an annotation precedes the item of interest in the form of a comment (420). Items that are not items of interest may be copied from the CSS files 110 to an output buffer 120 (440).

If a font value with a preceding annotation is found (420), the font may be replaced with the selected font specified in the theme specification file 115 (425). The new font may then be passed to the output buffer 120 (425). If a color value with a preceding annotation is found (420), the color may be replaced with the selected color specified in the theme specification file 115 (425) if the selected color scheme meets legibility requirements. If the selected color scheme does not meet legibility requirements, alternatives may be suggested or automatically modified to match legibility properties associated with default color schemes. The new color may then be passed to the output buffer 120 (425).

If a reference to an image and a preceding annotation is found (420), at OPERATION 430, minor transformations may be performed, and image processing transformation operations may be passed to the output buffer 120 for processing in a subsequent step. At OPERATION (442), to-do items in the output buffer 120, such as an image processing item, may be performed. For example, for an image processing item, the image may be read from a file path, and the appropriate image processing may be performed (442). At OPERATION 445, an output file of the transformed item (e.g., processed image) may be produced and saved in a useful location. A path to the outputted file of the processed image may be outputted to the new CSS file 125 (445).

At OPERATION (450), the new CSS files 125 may be outputted to a renderer so that the new page 135 design may be displayed to the user. If the user wants to make changes, he/she may go back to a user interface 200,300 for selecting different design variables 305,310,315,320 which may be updated in the theme specification file 115. If an indication of a selection to keep the new page 135 design is received (455), the web site may be set to point to the new CSS files 125. Accordingly, when user accesses the web site, the code that outputs references to the CSS files may point at the folder containing the new CSS files 125 instead of the default path.

Figure 5:
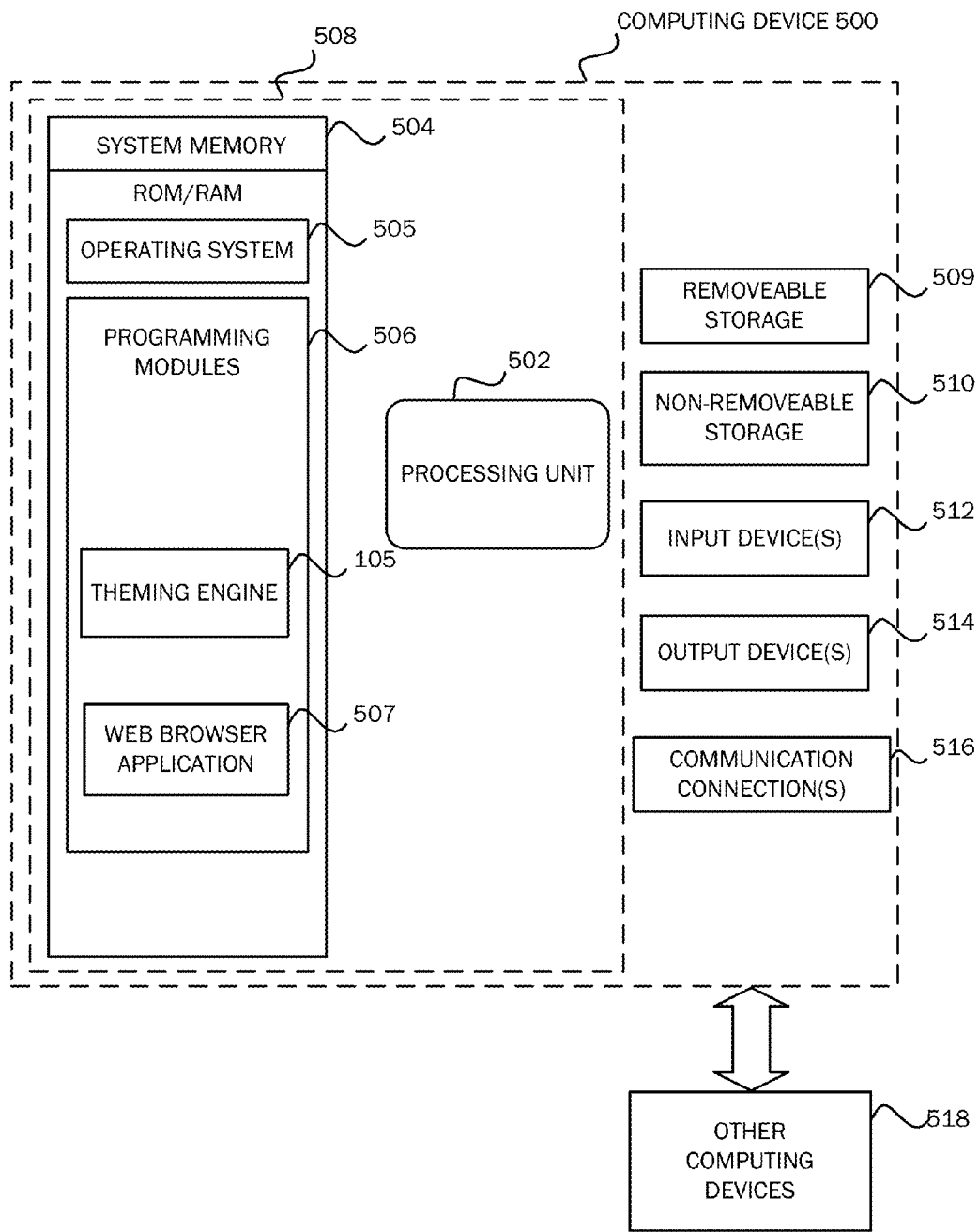
FIG. 5 is a block diagram illustrating example physical components of a computing device with which embodiments of the invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 500 with which embodiments of the invention may be practiced. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a theming engine 105. Operating system 505, for example, may be suitable for controlling computing device 500's operation. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510.

As stated above, a number of program modules and data files may be stored in system memory 504, including operating system 505. While executing on processing unit 502, programming modules 506, such as a theming engine 105 may perform processes including, for example, one or more method 400's operations as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to theming engine 105 may be operated via application-specific logic integrated with other components of the computing device/system 500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
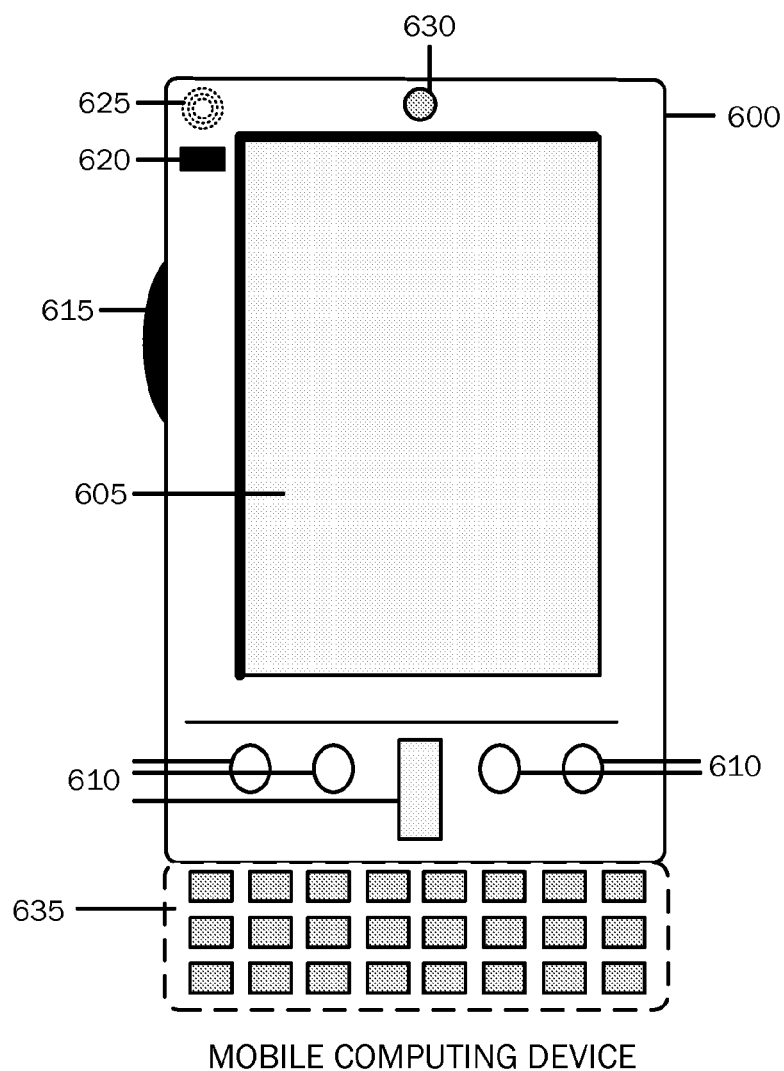
FIGS. 6A and 6B are simplified block diagrams of a mobile computing device with which embodiments of the present invention may be practiced.
Figure 6B:
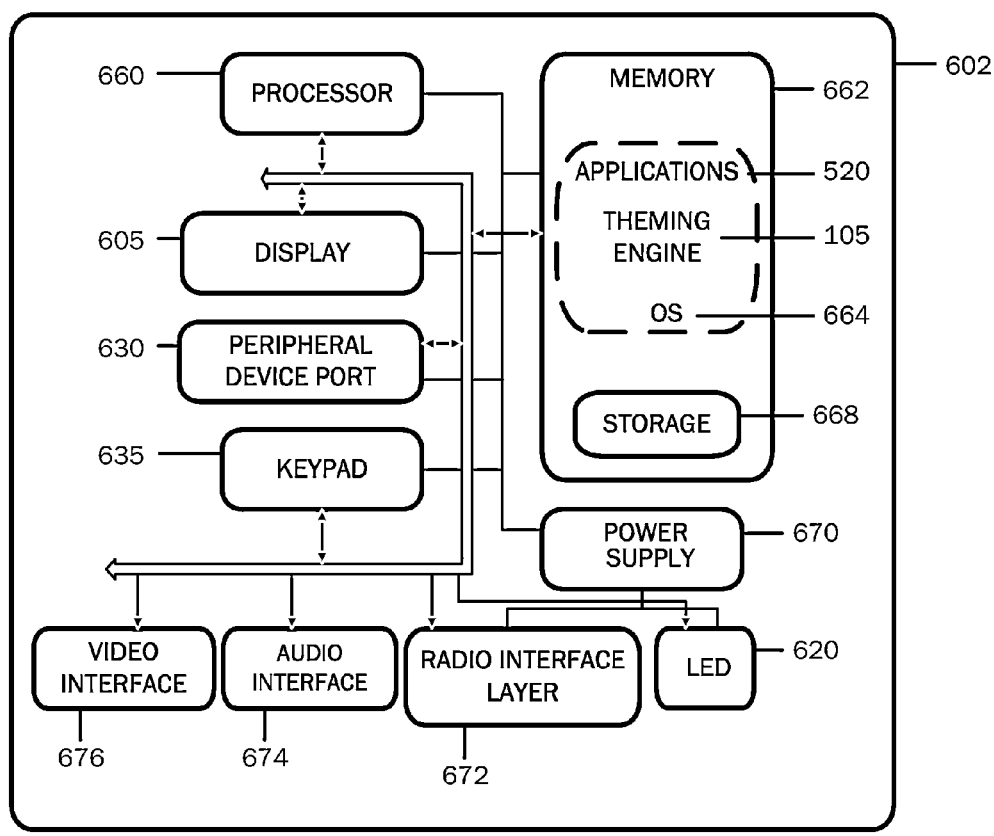
Figure 7:
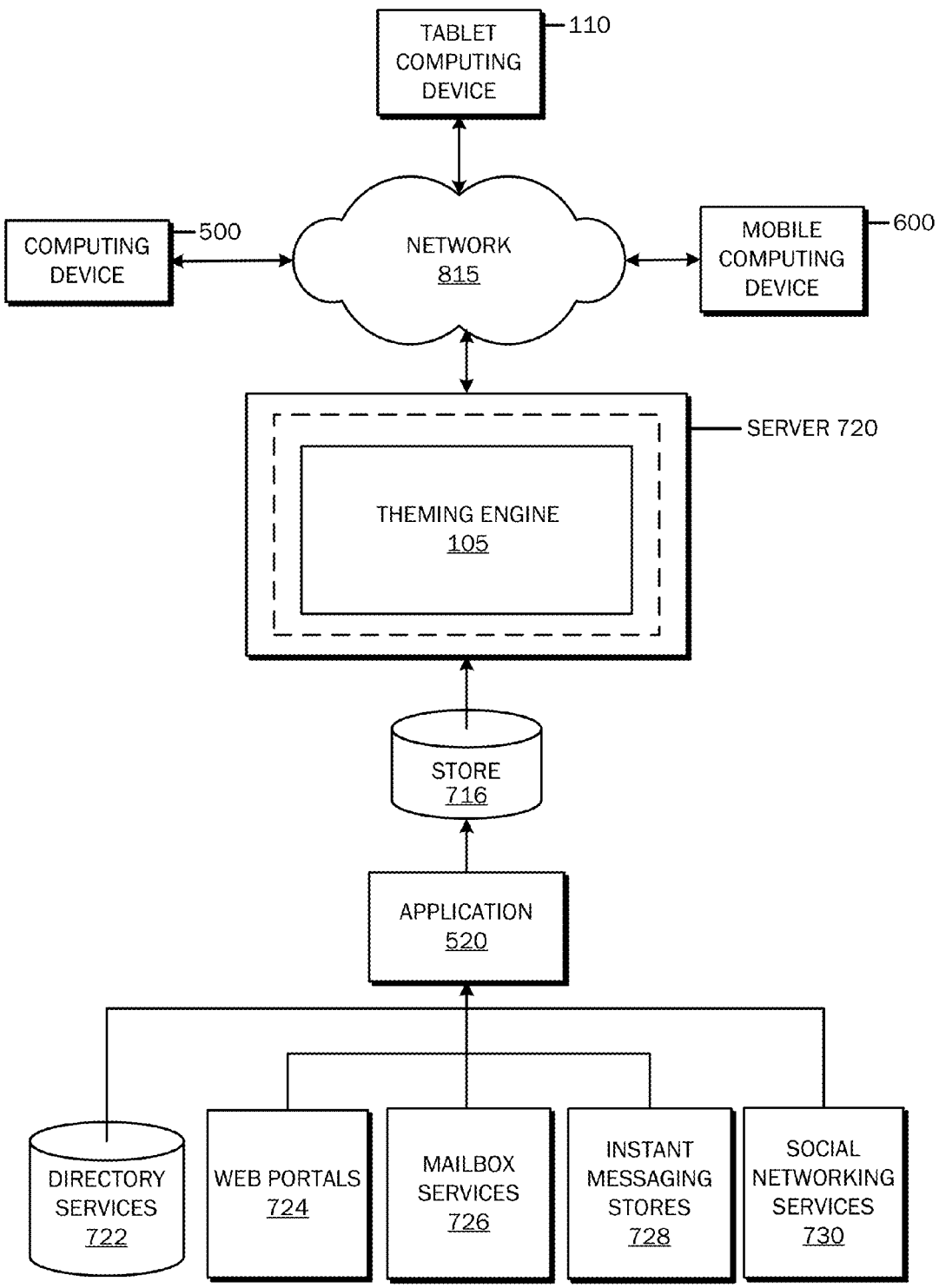
FIG. 7 is a simplified block diagram of a distributed computing system in which embodiments of the present invention may be practiced.

FIGS. 6A and 6B illustrate a suitable mobile computing environment, for example, a mobile telephone 600, a smartphone, a tablet personal computer, a laptop computer, and the like, with which embodiments of the invention may be practiced. With reference to FIG. 6A, an example mobile computing device 600 for implementing the embodiments is illustrated. In a basic configuration, mobile computing device 600 is a handheld computer having both input elements and output elements. Input elements may include touch screen display 605 and input buttons 615 that allow the user to enter information into mobile computing device 600. Mobile computing device 600 may also incorporate an optional side input element 615 allowing further user input. Optional side input element 615 may be a rotary switch, a button, or any other type of manual input element. In alternative embodiments, mobile computing device 600 may incorporate more or less input elements. For example, display 605 may not be a touch screen in some embodiments. In yet another alternative embodiment, the mobile computing device is a portable phone system, such as a cellular phone having display 605 and input buttons 615. Mobile computing device 600 may also include an optional keypad 735. Optional keypad 635 may be a physical keypad or a "soft" keypad generated on the touch screen display.

Mobile computing device 600 incorporates output elements, such as display 605, which can display a graphical user interface (GUI). Other output elements include speaker 625 and LED light 620. Additionally, mobile computing device 600 may incorporate a vibration module (not shown), which causes mobile computing device 600 to vibrate to notify the user of an event. In yet another embodiment, mobile computing device 600 may incorporate a headphone jack (not shown) for providing another means of providing output signals.

Although described herein in combination with mobile computing device 600, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices.

FIG. 6B is a block diagram illustrating components of a mobile computing device used in one embodiment, such as the computing device shown in FIG. 6A. That is, mobile computing device 600 can incorporate system 602 to implement some embodiments. For example, system 602 can be used in implementing a "smart phone" that can run one or more applications similar to those of a desktop or notebook computer such as, for example, browser, e-mail, scheduling, instant messaging, and media player applications. In some embodiments, system 602 is integrated as a computing device, such as an integrated personal digital assistant (PDA) and wireless phone.

One or more application programs 666 may be loaded into memory 662 and run on or in association with operating system 664. Examples of application programs include phone dialer programs, e-mail programs, PIM (personal information management) programs, word processing programs, spreadsheet programs, Internet browser programs, messaging programs, and so forth. System 602 also includes non-volatile storage 668 within memory 662. Non-volatile storage 668 may be used to store persistent information that should not be lost if system 602 is powered down. Applications 666 may use and store information in non-volatile storage 668, such as e-mail or other messages used by an e-mail application, and the like. A synchronization application (not shown) also resides on system 602 and is programmed to interact with a corresponding synchronization application resident on a host computer to keep the information stored in non-volatile storage 668 synchronized with corresponding information stored at the host computer. As should be appreciated, other applications may be loaded into memory 662 and run on the device 600, including a theming engine 105, described herein.

System 602 has a power supply 670, which may be implemented as one or more batteries. Power supply 670 might further include an external power source, such as an AC adapter or a powered docking cradle that supplements or recharges the batteries.

System 602 may also include a radio 672 that performs the function of transmitting and receiving radio frequency communications. Radio 672 facilitates wireless connectivity between system 602 and the "outside world", via a communications carrier or service provider. Transmissions to and from radio 672 are conducted under control of OS 664. In other words, communications received by radio 672 may be disseminated to application programs 666 via OS 664, and vice versa.

Radio 672 allows system 602 to communicate with other computing devices, such as over a network. Radio 672 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 602 is shown with two types of notification output devices; LED 620 that can be used to provide visual notifications and an audio interface 674 that can be used with speaker 625 to provide audio notifications. These devices may be directly coupled to power supply 670 so that when activated, they remain on for a duration dictated by the notification mechanism even though processor 660 and other components might shut down for conserving battery power. LED 620 may be programmed to remain on indefinitely until the user takes action to indicate the powered-on status of the device. Audio interface 674 is used to provide audible signals to and receive audible signals from the user. For example, in addition to being coupled to speaker 625, audio interface 674 may also be coupled to a microphone to receive audible input, such as to facilitate a telephone conversation. In accordance with embodiments of the present invention, the microphone 620 may also serve as an audio sensor to facilitate control of notifications, as will be described below. System 602 may further include video interface 676 that enables an operation of on-board camera 630 to record still images, video stream, and the like.

A mobile computing device implementing system 602 may have additional features or functionality. For example, the device may also include additional data storage devices (removable and/or non-removable) such as, magnetic disks, optical disks, or tape. Such additional storage is illustrated in FIG. 6B by storage 668. Computer storage media may include volatile and nonvolatile, removable and non-removable media implemented in any method or technology for storage of information, such as computer readable instructions, data structures, program modules, or other data.

Data/information generated or captured by the device 600 and stored via the system 602 may be stored locally on the device 600, as described above, or the data may be stored on any number of storage media that may be accessed by the device via the radio 672 or via a wired connection between the device 600 and a separate computing device associated with the device 600, for example, a server computer in a distributed computing network, such as the Internet. As should be appreciated such data/information may be accessed via the device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture for providing dynamically generated indices, as described above. Content developed, interacted with or edited in association with a theming engine 105 may be stored in different communication channels or other storage types. For example, various content items along with information from which they are developed may be stored using directory services 722, web portals 724, mailbox services 726, instant messaging stores 728 and social networking sites 730. The theming engine 105 may use any of these types of systems or the like for generating new CSS files 125 incorporating input CSS files 110 and one or more theme specification files 115, as described herein. A server 720 may receive requests to run the theming engine 105 and pass items to clients. As one example, server 720 may be a web server providing content over the web. Server 720 may provide content over the web to clients through a network 715. Examples of clients that may obtain content include computing device 500, which may include any general purpose personal computer 500, a tablet computing device 110 and/or mobile computing device 500 which may include smart phones. Any of these devices may obtain content from the store 716.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method implemented by a computing device for transforming presentation properties of a page, the method comprising:

receiving a first input item, the first input comprising one or more values associated with a layout, a color, a font, or an image for defining presentation properties of the page;

receiving a second input item corresponding to the page, the second input defining one or more design variables selected by a user, the one or more design variables specifying a layout, a color scheme, a font scheme, or a background image;

scanning, by the computing device, the received first input item for the one or more values associated with the layout, the color, the font, or the image for use in the page;

determining, by the computing device, if the one or more design variables defined in the second input item match legibility factors of values defined for default color schemes or font schemes;

modifying, by the computing device, the one or more design variables selected by the user to preserve legibility properties of the default color schemes or font schemes while preserving a hue, including changing a lightness of the one or more design variables or changing the lightness to a proportional inverse of the lightness of the default color schemes or font schemes;

modifying, by the computing device, the one or more values associated with the layout, the color, the font, or the image according to the one or more design variables defined in the second input item; and outputting, by the computing device, the modifications into one or more style sheets for defining the presentation properties of the page.

2. The method of claim 1, wherein the first input item is one or more cascading style sheet (CSS) files and the second input item is one or more theme specification files.

3. The method of claim 1, wherein modifying one or more of the one or more values associated with the color, the font, or the image in the first input item according to the one or more design variables defined in the second input item further comprises determining if the one or more design variables defined in the second input item match legibility factors of values defined for the default color schemes or font schemes.

4. The method of claim 3, wherein if a design variable defined in the second input item does not match legibility factors of values defined for the default color schemes or font schemes, modifying the design variable selected by the user to preserve legibility properties of the default color schemes or font schemes.

5. The method of claim 1, wherein if a value associated with the image is found and an annotation indicating a modification to the image is found:

outputting the value and the annotation to an output buffer;

reading the image from a file path;

applying modifications to the image;

producing and storing an output file of the modified image;

outputting a path to the outputted file of the modified image; and outputting the path to the outputted file of the modified image to the one or more style sheets for defining the presentation properties of the page.

6. The method of claim 5, wherein the image is annotated to be the background image.

7. The method of claim 5 wherein the value associated with a color includes one of various color syntaxes.

8. The method of claim 7 wherein one of various color syntaxes includes a syntax comprising a translucency value.

9. The method of claim 1, wherein if a value associated with the font is found and an annotation indicating a modification to the font is found, prior to modifying the font:
    searching for whether a uniform resource locator (URL) is described in the font scheme; and if a URL is described in the font scheme, embedding the font in the one or more style sheets for defining the presentation properties of the page.

10. The method of claim 1, further comprising outputting the one or more style sheets for defining the presentation properties of the page to a renderer for rendering a web page.

11. A system for transforming presentation properties of a page, the system comprising:
    a processor; and
    a memory containing computer-executable instructions which when executed by the processor produce a theming engine operable to:
        receive a first input item, the first input comprising one or more values associated with a layout, a color, a font, or an image for defining presentation properties of the page;
        receive a second input item corresponding to the page, the second input defining one or more design variables selected by a user, the one or more design variables specifying a layout, a color scheme, a font scheme, or a background image;
        scan, by the processor, the received first input item for a value associated with the layout, the color, the font, or the image for use in the page;
        if the value associated with the layout, the color, the font, or the image is found, search for an annotation, the annotation indicating a modification to the layout, the color, the font, or the image;
        if the annotation indicating the modification to the layout, the color, the font, or the image is found, modify, by the processor, one or more of the one or more values associated with the layout, the color, the font, or the image in the first input item according to the one or more design variables defined in the second input item;
        if a design variable defined in the second input item does not match legibility factors of values defined for default color schemes or font schemes, modify, by the processor, the one or more design variables selected by the user to preserve legibility properties of the default color schemes or font schemes while preserving the a hue, including changing a lightness of the one or more design variables or changing the lightness to a proportional inverse of the lightness of the default color schemes or font schemes;
        if the design variable defined in the second input item matches legibility factors of values defined for the default color schemes or font schemes, modify, by the processor, the one or more values associated with the layout, the color, the font, or the image according to the design variable defined in the second input item; and
        output, by the processor, the modifications into one or more style sheets for defining the presentation properties of the page to a renderer for rendering a web page.

12. The system of claim 11, wherein the theming engine is further operable to determine if the design variable defined in the second input item matches legibility factors of values defined for the default color schemes or font schemes.

13. The system of claim 12, wherein the design variable defined in the second input item does not match legibility factors of values defined for the default color schemes or font schemes, the theming engine is further operable to modify the design variable selected by the user to preserve legibility properties of the default color schemes or font schemes.

14. The system of claim 11, wherein if the value associated with the font is found and the annotation indicating the modification to the font is found, prior to modifying the font the theming engine is further operable to:
    search for whether a uniform resource locator (URL) is described in the font scheme; and
    if a URL is described in the font scheme, embed the font in the one or more style sheets for defining the presentation properties of the page.

15. The system of claim 11, wherein if the value associated with the image is found and the annotation indicating the modification to the image is found, the theming engine is further operable to:
    output the value and the annotation to an output buffer;
    read the image from a file path;
    apply modifications to the image;
    produce and storing an output file of the modified image;
    output a path to the outputted file of the modified image; and
    output the path to the outputted file of the modified image to the one or more style sheets for defining the presentation properties of the page.

16. The system of claim 15, wherein the image is annotated to be the background image and the value associated with the color includes a syntax comprising a translucency value.

17. The system of claim 11, wherein the first input item is a set of CSS files, the second input item is one or more theme specification files, and the one or more style sheets for defining the presentation properties of the page is a set of transformed CSS files.

18. A computer readable memory containing computer-executable instructions which when executed by a computer perform a method for transforming presentation properties of a web page, the method comprising:
    receiving a first input item, the first input item comprising one or more values associated with a layout, a color, a font, or an image for defining presentation properties of the web page;
    receiving a second input item corresponding to the web page, the second input defining one or more design variables selected by a user, the one or more design variables specifying a layout, a color scheme, a font scheme, or a background image;
    scanning, by the computer, the received first input item for a value associated with the layout, the color, the font, or the image for use in the web page;
    if the value associated with the layout, the color, the font, or the image is found, searching for an annotation, the annotation indicating a modification to the layout, the color, the font, or the image;
    if the annotation indicating the modification to the layout, the color, the font, or the image is found, determining, by the computer, if the one or more design variables defined in the second input item match legibility factors of values defined for default color schemes or font schemes;
    if a design variable defined in the second input item does not match legibility factors of values defined for the default color schemes or font schemes, modifying, by the computer, the design variable selected by the user to preserve legibility properties of the default color schemes or font schemes while preserving a hue, including changing a lightness of the one or more design variables or changing the lightness to a proportional inverse of the lightness of the default color schemes or font schemes;

if the design variable defined in the second input item matches legibility factors of values defined for the default color schemes or font schemes, modifying, by the computer, the value associated with the layout, the color, the font, or the image in one or more received CSS files according to the design variable defined in the second input item; and outputting, by the computer, the modifications into a transformed set of CSS files to a renderer for rendering the web page.

19. The computer readable medium of claim 18, further comprising if the value associated with the font is found and the annotation indicating the modification to the font is found, searching for whether a uniform resource locator (URL) is described in the font scheme, and if a URL is described in the font scheme, embedding the font in the transformed set of CSS files.

* * * * *